Nov. 13, 1934.　　　F. O. HOAGLAND　　　1,980,336
CHUCK RETAINING MEANS
Filed May 17, 1933
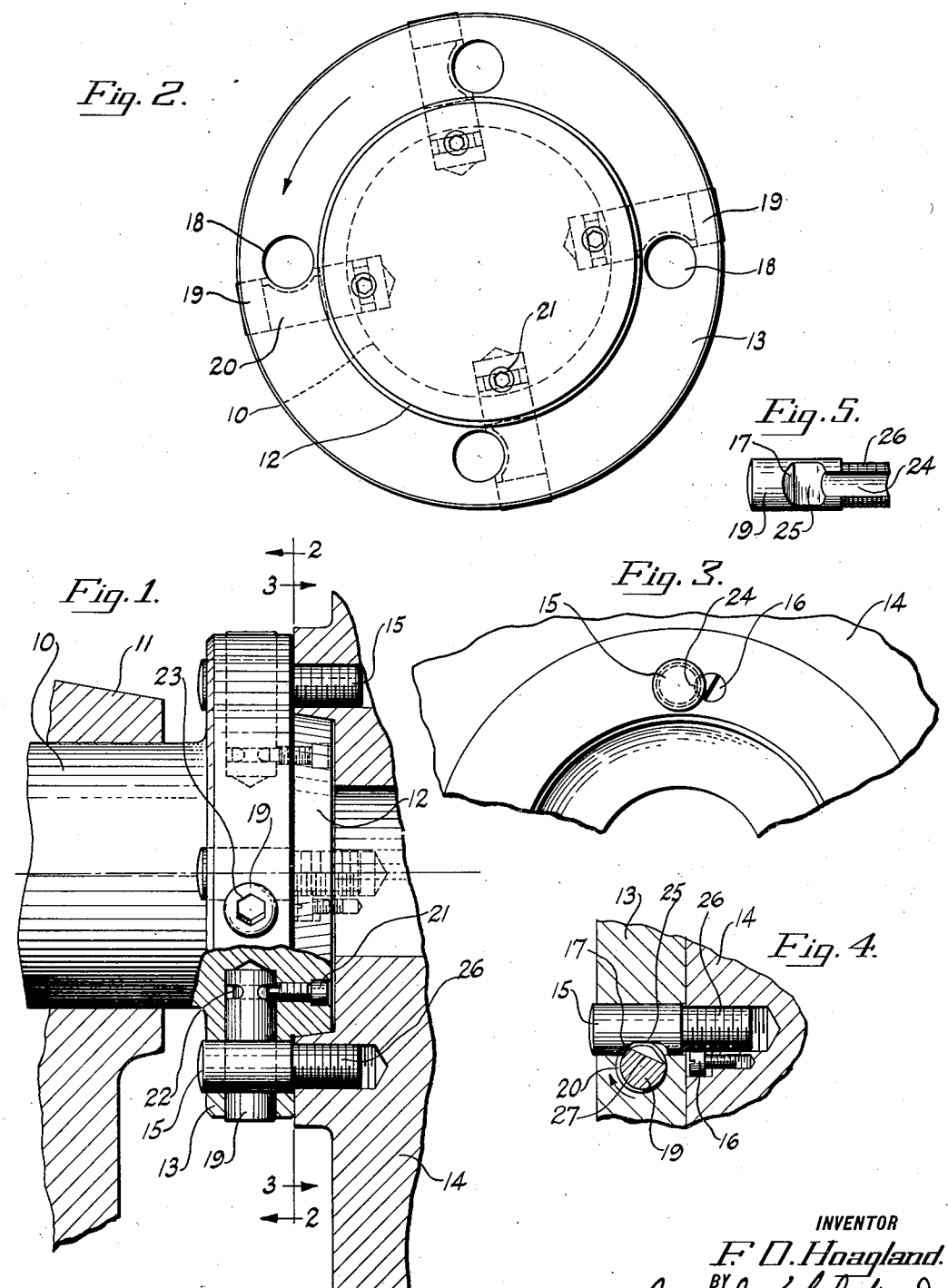
INVENTOR
F. O. Hoagland.
BY
Joseph K. Schofield
ATTORNEY Patented Nov. 13, 1934

1,980,336

UNITED STATES PATENT OFFICE 1,980,336

CHUCK RETAINING MEANS

Frank O. Hoagland, West Hartford, Conn., assignor to Pratt & Whitney Company, Hartford, Conn., a corporation of New Jersey Application May 17, 1933, Serial No. 671,554

12 Claims. (Cl. 82—30)

This invention relates to supporting means for chucks and other work holding devices upon machine tool spindles and particularly relates to a chuck retainer for lathes.

A primary object of the invention is to provide improved retaining means for a chuck or other work holder on the end of a work rotating spindle of a machine tool enabling the chuck to be quickly mounted in position on the spindle or demounted therefrom, the chuck being secured thereto rigidly and accurately when in position thereon.

One feature which enables me to accomplish the above named object is that a tapered projection is formed on the forward end of the spindle engaging a correspondingly formed recess in the chuck or adapter for a chuck or other work holder so that the chuck will be accurately centered in position upon the spindle with its axis in alinement with the axis of the spindle.

Another feature which is of importance is that a plurality of spaced studs are provided outstanding from the chuck and adapted to be received within recesses or openings formed within a portion of the spindle wherein they may be individually locked securely in position.

Another object of the invention is to provide rotatable cam locking members within the spindle, preferably extending within a flange thereon and adapted to be rotated as by means of a wrench so that cam surfaces on the members may engage and draw the bolts individually toward the flange and thus securely retain the chuck in position on the spindle.

With these and other objects in view, my invention includes the features of construction and operation set forth in the following specification and illustrated in the accompanying drawing.

In the accompanying drawing annexed hereto and forming a part of this specification, I have shown my invention embodied in a work supporting chuck for an engine lathe but it will be understood that the invention can be otherwise embodied and that the drawing is not to be construed as defining or limiting the scope of the invention, the claims appended to this specification being relied upon for that purpose.

In the drawing:

Figure 1 is a fragmentary view in side elevation of a portion of a work supporting chuck and machine tool spindle, parts being broken away to more clearly show the improved retaining means.

Fig. 2 is an end view of the lathe or machine tool spindle shown in Fig. 1 looking in the direction of the arrows 2—2.

Fig. 3 is a fragmentary view of the end face of the chuck or adapter for a chuck shown in Fig. 1 looking in the direction of the arrows 3—3.

Fig. 4 is a side view of a portion of the chuck and spindle in section showing the cam locking member ready for being rotated into retaining position relative to its stud, and Fig. 5 is a side view of one of the studs.

In the above mentioned drawing I have shown but one embodiment of the invention which is now deemed preferable but it is to be understood that changes and modifications may be made within the scope of the appended claims without departing from the spirit of the invention.

Briefly and in its preferred aspect, my invention may include the following principal parts: First, a work supporting and rotating spindle preferably having a tapered projection on its forward end and also having an outwardly extending flange adjacent thereto; second, a chuck or other form of work supporting and rotating member having a recess engaging the projection and having an annular series of outstanding studs projecting parallelly to each other and to the axis of rotation of the spindle and chuck; third, rotatable cam members housed within the spindle and intercepting openings within the flange of the spindle into which the studs extend; fourth, screw threads on the studs providing adjustment of the studs toward and from the chuck so that abutments on the studs may be positioned for proper engagement respectively with their locking members; fifth, individual retaining means for the studs permitting slight angular movement thereof so that the abutment surfaces may adjust themselves to proper bearing upon the cam surfaces of the cam member; sixth, means to retain the cam members in position within the spindle; and seventh, means to rotate the cam members to lock or unlock them with respect to their studs.

In operating machine tools it is essential to have a wide variety of work supporting and retaining means, generally in the form of chucks, and adapted for mounting upon the end of a rotatable spindle. This is for the purpose of adapting the machine tool for wide varieties of work which cannot be handled in a single work supporting and rotating member. It is also highly desirable to have these work supporting members adapted for ready mounting upon the spindle, accurately in alinement with the spindle and rigidly secured thereto.

Referring more in detail to the figures of the drawing, I provide a work supporting and rotating spindle 10 of the type generally found in engine lathes rotatable within a suitable bearing 11 forming a portion of the base or headstock of the machine tool. On the forward end of this spindle 10 is a tapered projection 12 preferably in the form of a frustum concentric with the axis of rotation of the spindle 10. Closely adjacent this conical or tapered extension 12 is an annular outstanding flange 13. Adapted to be positioned upon this end of the spindle 10 is a chuck or other work supporting member 14, a portion only of which is shown. This chuck 14 is provided with a recess within one of its faces closely engaging the tapered projection 12 on the forward end of the spindle 10. With the chuck 14 mounted upon this extension 12 it is supported for rotation precisely in alinement with the spindle axis. Outstanding from the face of the chuck 14 are a plurality of short studs 15 preferably threaded into the chuck 14 and each extending parallelly to the axis of rotation of the chuck. These studs 15, as shown, are equally spaced in a circular series on the end face of the chuck so that they are equidistant from the axis of rotation. To retain these studs 15 in adjusted position within the chuck a small cap screw 16 is provided threaded into the chuck closely adjacent the threaded holes for the stud, the head of the cap screw entering an arcuate recess 24 provided along the side of the stud. Preferably the stud 15 has a slightly wider recess, as shown in Fig. 5, than the head of the screw 16 so that limited angular movement of the stud 15 is permitted in any adjustment thereof. Also on the stud 15 is a transverse recess 25 cut out from one side of the outstanding portion thereof, the outer surface 17 of which is beveled to an oblique plane surface. By threading a stud 15 into or out of its recess by its screw threads 26 this oblique abutment surface 17 may be adjusted relatively toward or from the face of the chuck.

In order to retain the chuck 14 in position on the spindle 10, holes or recesses 18 are provided within the outwardly extending flange 13 on the spindle 10, these openings 18 being adapted to loosely receive individual studs 15. Adjacent the openings 18 within the flange 13 for the studs 15 are housed rotatable cam members 19. These members extend substantially radially within the flange 13 and intercept the openings for the studs 15. As shown most clearly in Fig. 4, the cam members 19 have an intermediate portion 20 of slightly increasing diameter about its periphery forming a spiral cam surface which is adapted to engage the abutment surface 17 when a stud 15 is inserted within the opening 18. One side of this cam portion 20 of the locking member 19 is cut away as at 27 so that in one rotative position the studs 19 may enter the holes 18. Retaining means for the cam locking members 19 are provided, these being in the form of screws 21 threaded into the spindle and engaging a circumferential groove 22 within the innermost portion of the cam member 19. As complete rotation of the cam locking members 19 is not desired, this groove 22 for receiving the inner end of the retaining screw 21 may extend only partially about the circumference.

In the operation of mounting a chuck 14 in position on a spindle 10, the cam locking members 19 are moved to positions where their transverse recesses 27 allow the studs 15 to enter the openings 18 through the flange 13. With the chuck 14 retained temporarily in position the cam members 19 are individually rotated preferably in a direction as indicated by the arrow in Fig. 4 to engage and force its stud into the recess and thus clamp the chuck 14 against the outer face of the flange 13. The direction of rotation of the cam locking member 19 is preferably that shown in Fig. 4 for the purpose of forming a self-locking or self-retaining feature; pressure of the chuck away from the spindle tending to further rotate the cam and therefore lock the stud 15 more firmly in position. In order to rotate the cam members 19 to lock or unlock the studs 15, hexagon recesses 23 are provided within their outer ends. Into these openings a wrench of conventional form may be inserted. By individually tightening each of the cam members 19 upon its stud 15 the chuck 14 is drawn toward and upon the projection 12. This projection 12 is so proportioned also that in locked position the chuck tightly engages this projection 12 and also engages against the forward face of the flange 13.

As shown in Fig. 2 the cam members 19 are placed in advance of the openings 18 for the studs 15 so that the studs will be forced against and the chuck will be rotated by engagement of the studs 15 with integral portions of the spindle. With the studs 15 accurately spaced upon the same circle as the holes 18 a chuck 14 may be placed upon the spindle 10 with any stud 15 fitting within any of the openings 18. Also by adjusting the studs 15 by complete turns thereof the cam members 19 may be properly engaged to tighten any chuck desired to be used upon the spindle 10. For this purpose the tightening effect of the cam members 19 upon the studs 15 extends over a distance greater than the pitch of the threaded portion of the studs. There will therefore always be one adjustment of a stud 15 where its abutment 17 will engage the spiral cam surface 20 to draw the stud and the chuck 14 toward the flange 13.

What I claim is:

1. A retaining means for chucks comprising in combination, a spindle having a flange thereon, said flange having openings therein extending parallelly to the axis of said spindle, and rotatable cams mounted within said flange adjacent and intercepting said openings whereby studs outstanding from a chuck mounted on said spindle in one rotative position of the cams may enter the openings and in other rotative positions may be engaged by said cams to retain said chuck rigidly in position on said spindle.

2. A retaining means for chucks comprising in combination, a spindle having a flange thereon, said flange having openings therein extending parallelly to the axis of said spindle, and rotatable cams having a cut-away portion and a spiral surface mounted within said flange adjacent and intercepting said openings whereby studs outstanding from a chuck mounted on said spindle may be engaged by said spiral surfaces of said cams to draw said chuck against said flange and retain said chuck rigidly in position on said spindle.

3. A retaining means for chucks comprising in combination, a spindle having a flange thereon, an extension adjacent thereto extending axially of said spindle, said flange having openings extending parallelly to the axis of said spindle, rotatable cams mounted substantially radially within said flange adjacent and intercepting said openings whereby studs outstanding from a chuck mounted on said spindle may be engaged by said cams to retain said chuck upon said extension and against said flange, and a wrench engaging portions at the outer ends of said cams.

4. A retaining means for chucks comprising in combination, a spindle having a flange thereon, a conical extension adjacent thereto extending axially of said spindle, said flange having openings extending parallelly to the axis of said spindle, rotatable cams mounted substantially radially within said flange adjacent and intercepting said openings whereby studs outstanding from a chuck mounted on said spindle may be engaged by said cams to draw said chuck against said flange and over said extension and retain said chuck rigidly in position upon said spindle, and means to engage rotating means for said cams at the outer ends thereof.

5. A retaining means for chucks comprising in combination, a chuck, a plurality of parallelly disposed studs outstanding from a face thereof, each of said studs extending parallelly to the axis of rotation of said chuck, said studs having recesses within a side portion to provide an abutment thereon, means to retain said studs in adjusted position, said means permitting limited angular movement thereof whereby said chuck may be mounted upon a spindle and retained rigidly in position thereon by means engaging the abutments on said studs.

6. A retaining means for chucks comprising in combination, a chuck, a plurality of parallelly disposed studs outstanding from a face thereof, each of said studs extending parallelly to the axis of rotation of said chuck, said studs having recesses within a side portion to provide an abutment thereon, means to axially adjust said studs relative to said chuck, and means to retain said studs in adjusted position, said means permitting limited angular movement thereof whereby said chuck may be mounted upon a spindle and retained rigidly in position thereon by means engaging the abutments on said studs.

7. A work supporting and rotating device comprising in combination, a spindle, a chuck mounted thereon, said spindle having a flange and an extension on its forward end, said chuck having a recess within which said projection extends, fastening means for said chuck comprising studs having limited rotation and extending from said chuck within recesses within said flange, and cam locking members in said flange engaging said studs whereby said chuck may be centered upon said projection and rigidly retained in position on said spindle.

8. A work supporting and rotating device comprising in combination, a spindle, a chuck mounted thereon, said spindle having a flange and an extension on its forward end, said chuck having a recess within which said projection extends and closely engages, studs outstanding from said chuck in a direction parallel to the axis of revolution thereof, and cam locking members rotatably mounted and retained within said flange and engaging said studs whereby said chuck may be centered upon said projection and rigidly retained in position on said spindle by said studs and members.

9. A work supporting and rotating device comprising in combination, a spindle, a chuck mounted thereon, said spindle having a flange and a tapered extension on its forward end, said chuck having a correspondingly tapered recess within which said projection extends, studs outstanding from said chuck in a direction parallel to the axis of revolution thereof, abutments formed on said studs, and cam locking members rotatably mounted and retained within said flange and engaging the abutments on said studs whereby said chuck may be centered upon said projection and rigidly retained in position on said spindle by said studs and members.

10. A work supporting and rotating device comprising in combination, a spindle, a chuck mounted thereon, said spindle having a flange and an extension on its forward end, said chuck having a recess within which said projection extends and closely engages, studs outstanding from said chuck in a direction parallel to the axis of revolution thereof, abutments formed on said studs, cam locking members rotatably retained within said flange, means to adjust said studs to properly engage said cam locking members with the abutments on said stud whereby said chuck may be centered upon said projection and rigidly retained in position on said spindle by said studs and members.

11. A work supporting and rotating device comprising in combination, a spindle, a chuck mounted thereon, adjustable studs outstanding from said chuck in a direction parallel to the axis of revolution thereof, and cam locking members rotatably mounted and retained within said spindle and engaging inclined transverse surfaces of said studs whereby said chuck may be rigidly retained in position on said spindle by said studs and members.

12. A work supporting and rotating device comprising in combination, a spindle, a chuck thereon, adjustable studs outstanding from said chuck in a direction parallel to the axis of revolution thereof, inclined transverse abutments formed on said studs and cam locking members rotatably mounted and retained in substantially radial positions within said flange and engaging the abutments on said studs whereby said chuck may be rigidly retained in position on said spindle by said studs and members.

FRANK O. HOAGLAND.